United States Patent
Yoshida et al.

(10) Patent No.: US 6,424,382 B1
(45) Date of Patent: Jul. 23, 2002

(54) ERROR PICTURE IMAGE DATA CORRECTION APPARATUS AND METHOD OF THE SAME

(75) Inventors: Tadahiro Yoshida, Osaka; Hiroyuki Ono, Hyogo; Tetsurou Hanaoka, Nara; Yasushi Fukushima; Toshiyuki Yasui, both of Osaka, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/419,950

(22) Filed: Oct. 18, 1999

(30) Foreign Application Priority Data

Oct. 28, 1998 (JP) .............................. 10-298045

(51) Int. Cl.⁷ .............................. H04N 5/21; H04N 9/64
(52) U.S. Cl. ................. 348/607; 348/616; 348/620; 348/701
(58) Field of Search ................. 348/470, 607, 348/608, 609, 610, 611, 612, 613, 616, 617, 618, 619, 620, 624, 701; H04N 5/21, 9/64

(56) References Cited

U.S. PATENT DOCUMENTS

| | | | | |
|---|---|---|---|---|
| 5,144,446 A | * | 9/1992 | Sudo et al. ................. | 348/617 |
| 5,260,775 A | * | 11/1993 | Farouda ..................... | 348/620 |
| 6,028,628 A | * | 2/2000 | Van Der Valk ............. | 348/616 |
| 6,081,917 A | * | 6/2000 | Yasui et al. ................ | 714/746 |

FOREIGN PATENT DOCUMENTS

JP 9-284783 10/1997

OTHER PUBLICATIONS

Embodiment 3; U.S. patent Application No. 08/838,638; pp. 24–29 (US 6081917, Jun., 2000, Yasui et al).

* cited by examiner

*Primary Examiner*—John W. Miller
*Assistant Examiner*—Brian P. Yenke
(74) *Attorney, Agent, or Firm*—Merchant & Gould PC

(57) ABSTRACT

The present invention is an error picture image data correction apparatus that can correct the error picture image data and suppress the image quality deterioration when there are plural error data in the continuous plural pixels and the data around the error picture image data are high frequency signal data. The apparatus comprises a weighted mean value operation part 101, 102 and 103 for calculating weighted mean value of the 2 pixel data having true value, a channel switch circuit 104, an adder 105, 106 and 109, a selector 107 and 108, a clip circuit 110, a control circuit 113 and an output switch circuit 111. When the input signals of the weighted mean value operation part 101, 102 and 103 at time i is described as $G(i)$, $R(i)$ respectively, t represents time width, $n>1$, $n>k \geq 0$, n and k are integers, and error data are $G(i)$, $G(i-t)$, $G(i-2t)$, ..., $G, (i-(n-1)t)$, the error data $G(i-kt)$ is replaced with the error correction data calculated by following Equation or its approximate equation.

$$R(i-kt)+\{(n-k)G(i+t)+(k+1)G(i-nt)-(n-k)R(i+t)-(k+1)R(i-nt)\}/(n+1)$$

14 Claims, 5 Drawing Sheets

ERROR PICTURE IMAGE DATA CORRECTION APPARATUS AND METHOD OF THE SAME

BACKGROUND OF THE INVENTION

1. Field of the Invention

The present invention relates to an error picture image data correction apparatus for correcting error data of the picture image signals outputted from a video camera etc. that employs a solid image capturing device. transmission and signal data processing are included in the picture image data of the audio visual apparatus such as a VCR, a video disk, a scanner and a camera, even though the error is about only one pixel, the picture quality may be remarkably deteriorated.

2. Description of the Art

When error data unintentionally generated in the process such as data transmission and signal data processing are included in the picture image data of the audio visual apparatus such as a VCR, a video disk, a scanner and a camera, even though the error is about only one pixel, the picture quality may be remarkably deteriorated.

Especially in case that the camera includes defective pixels in the image capturing device, the picture quality will be remarkably deteriorated because those error data are always generated and included in the output picture signals in the same fixed position corresponding to the defective pixels.

Especially in case that the camera includes defective pixels in the image capturing device, the picture quality will be remarkably deteriorated because those error data are always generated and included in the output picture signals in the same fixed position corresponding to the defective pixels.

In recent years, a solid image capturing device, especially a charge coupled device (hereinafter referred to as "CCD") is widely used as an image capturing device. However, the CCD has difficulty in the manufacturing process. Defective pixels are easily generated in the CCD pixels. Therefore, it is difficult to achieve enough high yields in the current CCD manufacturing technology. Considering the manufacturing cost, even though a manufactured CCD has some defective pixels, it will be employed as a product with an error picture image data correction apparatus for correcting the error data corresponding to the defective pixels.

As the conventional error picture image data correction apparatus, the apparatus disclosed by the unexamined Japanese patent application Tokkai-Hei 9-284783 is known. FIG. 5 is a block diagram that shows the configuration of the error picture image data correction apparatus of the above-mentioned application. In FIG. 5, 100a, 100b and 100c are input terminals in which each digital video signal corresponding to each R, G and B color channel is inputted respectively, 5011, 5021 and 5031 are delay elements that delay the inputted R, G and B signal data from input terminal 100a, 100b and 100c for one data period, and the delay elements are composed of D flip flop. Each output signal of these delay elements 5011, 5021 and 5031 is inputted to the output switch circuit 111 and the selector 108 respectively. 5012, 5022 and 5032 are delay elements that delay the output signal data from the delay element 5011, 5021 and 5031 for one data period, and the delay elements are composed of D flip flop. 5013, 5023 and 5033 are adders for adding each R, G and B signal inputted from input terminals 100a, 100b and 100c and each output signal outputted from delay elements 5012, 5022 and 5032 respectively. 5014, 5024 and 5034 are amplifiers for amplifying the inputted signal value by ½ by the bit shift and outputting the amplified signal data. These delay elements 5011, 5012, the adder 5013 and the amplifier 5014 compose the average mean value calculation circuit 501 corresponding to the R channel. The delay elements 5021, 5022, the adder 5023 and the amplifier 5024 compose the average mean value calculation circuit 502 corresponding to the G channel. The delay elements 5031, 5032, the adder 5033 and the amplifier 5034 compose the average mean value calculation circuit 503 corresponding to the B channel. Each average mean value is inputted to the channel switching circuit 104. The delay elements 5011 5021 and 5031 not only compose the average mean value calculation circuit but also work for adjusting the phase of the input signal of the output switch circuit 111 to the predetermined phase.

The circuit 104 is a channel switch circuit for selecting color channel signals specified by the channel signal chj, chk and chl outputted from the control circuit 508 and outputting these selected color channel signals as sj, sk and sl respectively. Herein, the signal chk is a signal for specifying the defect channel which includes the defect error data. The signal sk is a defect channel signal, and the chj channel and the chl channel are the correct channels. The signal sj and sl correspond to these chj and chl channels. 105 and 106 are the adders for generating the differential signal Dj=sk−sj, Dl=sk−sl. 107 is a selector for selecting the smaller value between the differential signal value Dj or Dl according to the control signal cd outputted from the controller circuit 508 and outputting the selected smaller value. 108 is a selector for selecting one color channel signal among R, G and B channel signals according to the channel signal ch2 and outputting the selected color channel signal. 109 is an adder for adding the output signal of the selector 107 and the output signal of the selector 108. 110 is a clip circuit for outputting the output signal of the adder 109 as it is when the output signal level is within the predetermined range, and clipping the output signal of the adder 109 between the maximum value and minimum value when the output signal level is beyond the predetermined range. Generally, the peak level of the picture signal is set as the maximum value and the block level is set as the minimum value. The output switch circuit 111 can input each R, G and B input signal and the correction data Dc which is the output signal of the clip circuit 110 and can select one signal among the inputted data according to the chk which is the output signal of the control circuit 508.

Hereinafter, the operation of the conventional error picture image data correction apparatus configured above is described below. FIG. 4 is a drawing for explaining the input signals of the conventional error picture image data correction apparatus when the error picture image data is included in high frequency input signal data. In this example, the error picture image data is only one pixel data of high frequency input signal data included in the G channel. Herein the G channel data G(i) is a defective data wherein i represents time and t represents a certain time width, the average mean value output signal RAV, GAV and BAV shown respectively by Equation 1 are calculated in the average mean value calculation circuit 501, 502 and 503.

$RAV=\{R(i+t)+R(i-t)\}/2$ $GAV=\{G(i+t)+G(i-t)\}/2$ $BAV=\{B(i+t)+B(i-t)\}/2$ (Equation 1)

The channel switch circuit 104 outputs the average mean value RAV, GAV and BAV as the output signal Sj, Sk and Sl respectively. The adder 105 and 106 output the differential signal GAV−RAV, GAV−BAV as the output signal Dj and Dl. In this example, it is apparently understood from the signal level of each channel as shown in FIG. 4, the Dl is larger than Dj (Dj<Dl). Therefore, the differential signal Dj is selected and outputted by the selector 107 according to the output control signal cd of the control circuit 508. The selector 108 outputs signal R(i) according to channel signal ch2, and the adder 109 generates signal G'(i) shown by Equation 2.

$$G'(i)=R(i)+\{G(i+t)+G(i-t)-R(i+t)-R(i-t)\}/2 \qquad \text{(Equation 2)}$$

Then, the clip circuit 110 outputs the correction data Dc, and the output switch circuit 111 replaces the error data G(i) with the correction data shown by Equation 2 and outputs the corrected data. The corrected data matches with the true value G(i) as shown in FIG. 4. Therefore, highly accurate error picture image data correction for the high frequency signal pattern can be achieved.

However, with the above-mentioned configuration, the conventional error picture image data correction apparatus can correct the error data appropriately only when there is only one error picture image data and the picture image data around the error picture image data are high frequency signal data as shown by FIG. 4. When there are plural error picture image data in the continuous plural pixels, the correction data will be generated based on the error picture image data. Therefore, an error correction data can not be achieved appropriately, this calculation error contained in the error correction data will work as noise, and the picture quality will be deteriorated. For example as for the solid image capturing device, even when the error picture image data does not exist in the continuous plural pixels originally, the error can be spread to the continuous plural pixels by the clock phase of the analog to digital conversion device or the characteristic of the pre-filter set in front of the analog to digital conversion device. In order to avoid this picture quality deterioration problem, a video camera must employ a defective pixel free solid image capturing device or a solid image capturing device with very few defective pixels. However, it is difficult to obtain enough yields in the current manufacturing process technology for the solid image capturing device with a number of pixels used for the high-definition television. This difficulty becomes a big factor that precludes the reduction of the manufacturing cost for the high-definition television camera.

SUMMARY OF THE INVENTION

Therefore, with the foregoing in mind, it is an object of the present invention to provide the solution for the above-mentioned problem and to provide an error picture image data correction apparatus that can correct the error picture image data and suppress the image quality deterioration when there are plural error data in the continuous plural pixels and the data around the error picture image data are high frequency signal data.

In order to achieve the above objects, an error picture image data correction apparatus of the present invention comprises an input part for inputting plural picture image data, a selector for selecting a first picture image data and a second picture image data respectively, an error correction part for replacing error picture image data with error correction data on the condition that the first picture image signal at time i is described as x(i), the second picture image signal at time i is described as y(i), t represents time width, $n>1$, $n>k>0$, n and k are integers, and error data are x(i), x(i−t), x(i−2t), ..., x(i−(n−1)t), the error data x(i−kt) is replaced with the error correction data calculated by Equation 3 or its approximate equation.

$$y(i-kt)+\{(n-k)x(i+t)+(k+1)x(i-nt)-(n-k)y(i+t)-(k+1)y(i-nt)\}/(n+1) \qquad \text{(Equation 3)}$$

According to the error picture image data correction apparatus of the present invention, the error picture image data correction can be achieved and the improvement of the picture quality can perform by canceling the deterioration of the picture quality caused by the error picture image data when the error picture image data exist in continuous plural pixels and the picture image data around the error picture image data are high frequency picture image data.

DESCRIPTION OF THE PREFERRED EMBODIMENTS

An error picture image data correction apparatus of the present invention comprises an input part for inputting plural picture image data, a selector for selecting a first picture image data and a second picture image data respectively, an error correction part for replacing error picture image data with error correction data on the condition that the first picture image signal at time i is described as x(i), the second picture image signal at time i is described as y(i), t represents time width, $n>1$, $n>k \geq 0$, n and k are integers, and error picture image data are x(i), x(i−t), x(i−2t), ..., x(i−(n−1)t), the error picture image data x(i−kt) is replaced with error correction data calculated by Equation 4 or its approximate equation.

$$y(i-kt)+\{(n-k)x(i+t)+(k+1)x(i-nt)-(n-k)y(i+t)-(k+1)y(i-nt)\}/(n+1) \qquad \text{(Equation 4)}$$

Hereinafter, the present invention will be described by way of embodiments with reference to the accompanying drawings. Herein, the same number used in the description of the conventional apparatus will be used for the same element if it is used in this embodiment.

Figure 1:
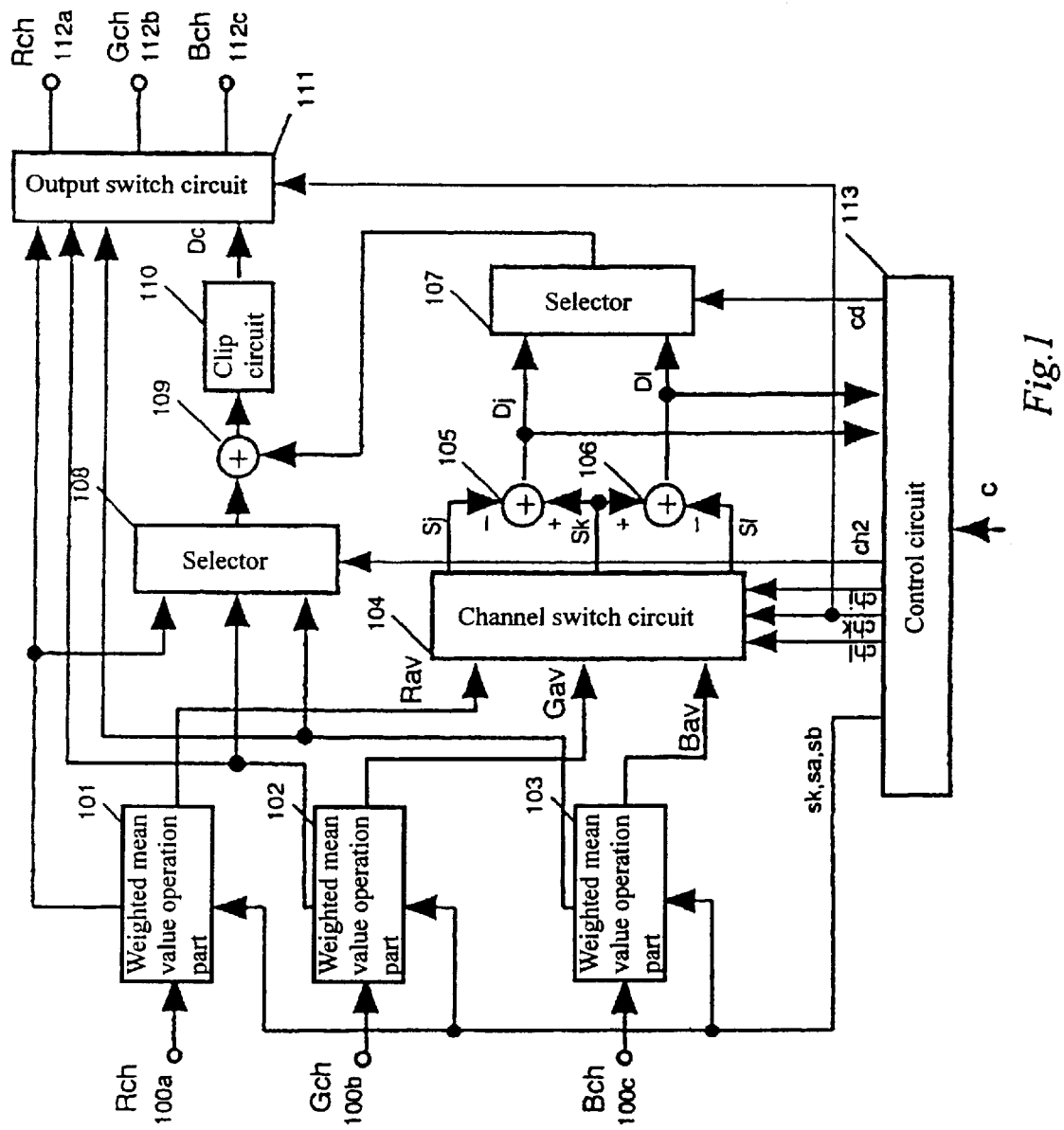
FIG. 1 is a schematic block diagram showing a configuration of an error picture image data correction apparatus according to an Embodiment of the present invention.
Figure 5:
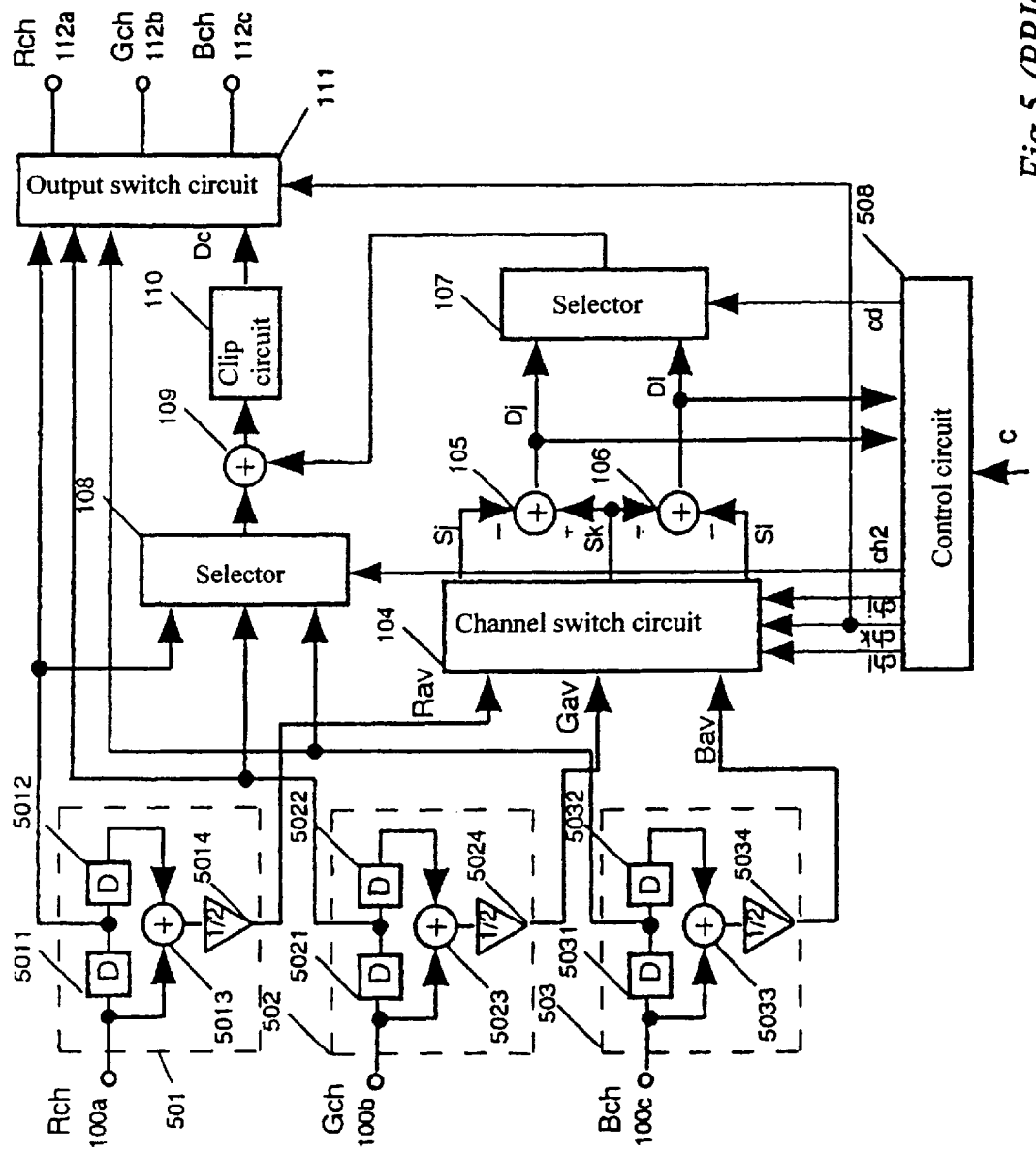
FIG. 5 is a schematic block diagram showing a configuration of a conventional error picture image data correction apparatus.

FIG. 1 is a schematic block diagram showing a configuration of an error picture image data correction apparatus according to this Embodiment of the present invention. This example shows a configuration for correcting 3 continuous pixels of error picture image data. In FIG. 1, 100a, 100b and 100c are input terminals in which each digital video signal corresponding to each R, G and B color channel is inputted respectively. 101, 102 and 103 are weighted mean value operation parts for calculating weighted mean value of the 2 pixel data having true value, one is located on the right side of the 3 continuous error picture image data in question, the other is located on the left side of the 3 continuos error picture image data in question. 113 is a control circuit for generating control signals that are required for error data correction. A control circuit 113 generates control signal Sk, Sa and Sb for controlling the weighted mean value operation part 101, 102 and 103 besides the controlling signal chj, chk, chl, ch2 and cd. In this example, the channel switch circuit 104, the adder 105, 106 and 109, the selector 107 and 108, the clip circuit 110 and the output switch circuit 111 are the same as shown in FIG. 5 described in the related art.

Figure 2:
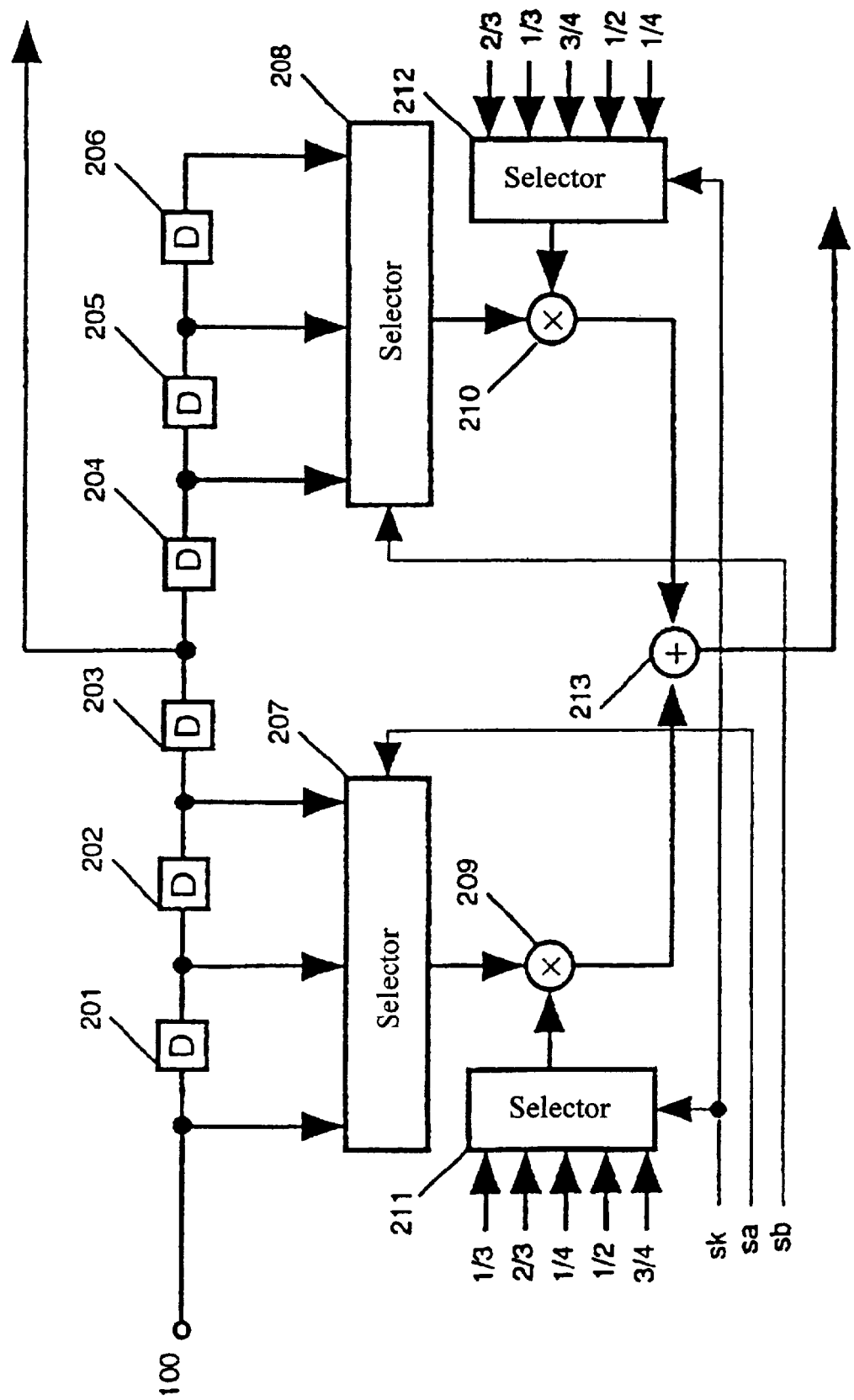
FIG. 2 is a schematic block diagram showing a configuration of an average weight gaining operation part in the error picture image data correction apparatus according to an Embodiment of the present invention.

FIG. 2 is a schematic block diagram showing a configuration of a weighted mean value operation part in the error picture image data correction apparatus according to this Embodiment of the present invention. In FIG. 2, 100 is an input terminal in which each digital video signal corresponding to each R, G and B color channel is inputted respectively, 201, 202, 203, 204, 205 and 206 are delay elements for delaying the input signal for one data. In this example, they are composed of D flip-flop. The output of the delay element 203 is input to the selector 108 and the output switch circuit 111 of FIG. 1. 207 is a selector for selecting and outputting one signal from the input/output signal of the delay element 201 or the output signal of the delay element 202 according to the control signal Sa outputted from the control circuit 113 of FIG. 1. 208 is a selector for selecting and outputting one signal from the delay element 204, 205 or 206 according to the control signal Sb outputted from the control circuit 113 of FIG. 1. 211 and 212 are the selectors for selecting and outputting one signal from the multiplier coefficient of multipliers 209 and 210 according to the control signal Sk outputted from the control circuit 113 of FIG. 1. 209 is a multiplier for multiplying the output signal of the selector 207 and the output signal of the selector 211. 210 is a multiplier for multiplying the output signal of the selector 208 and the output signal of the selector 212. 213 is an adder for adding the output signal of the selector 209 and the output signal of the selector 210. The output of the adder 213 is inputted to the channel switch circuit 104 of FIG. 1 as a weighted mean value data RAV, GAV and BAV corresponding to each color channel of R, G, and B.

Figure 3:
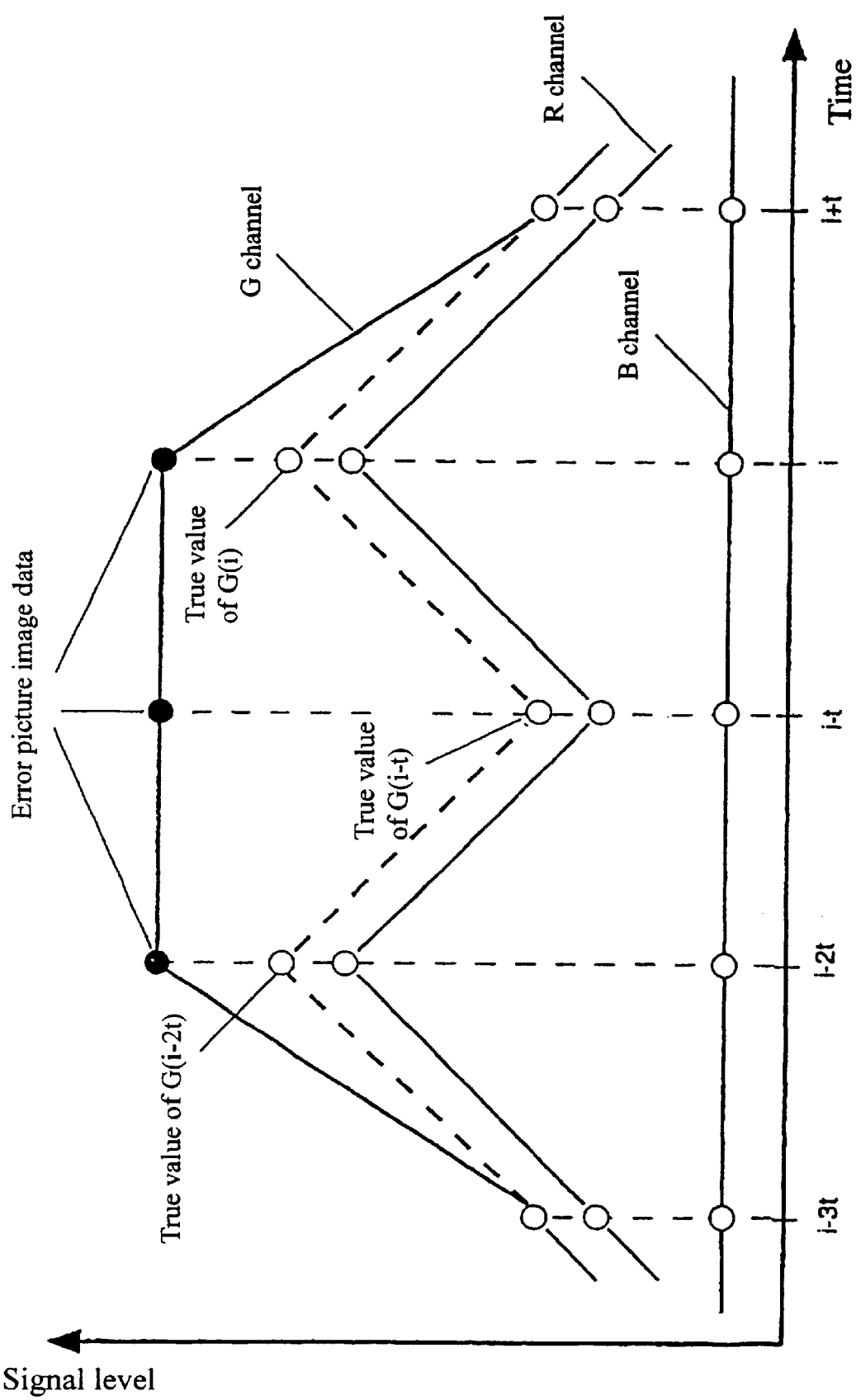
FIG. 3 is a diagram showing high frequency input data that contain the error data according to Embodiment of the present invention.
Figure 4:
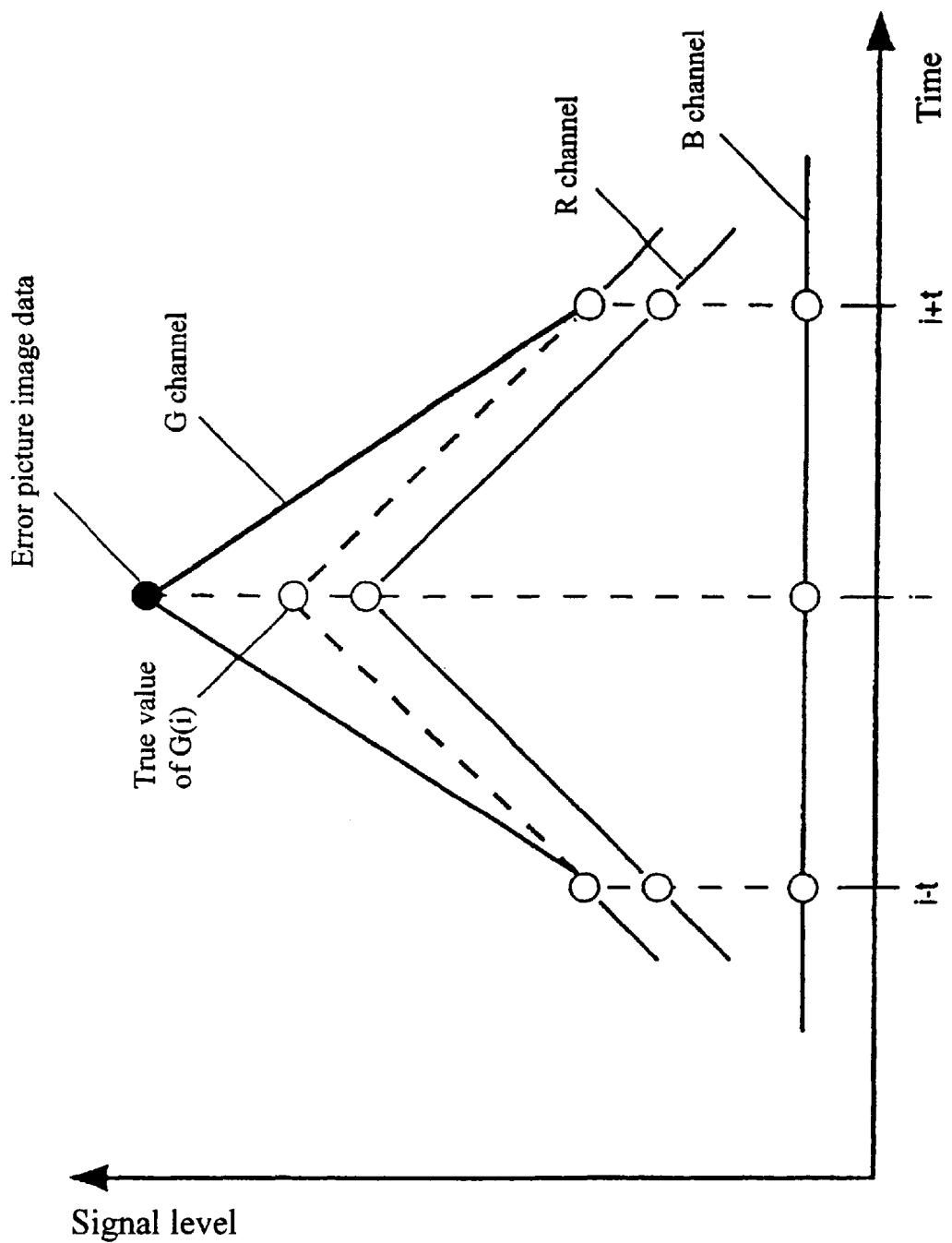
FIG. 4 is a diagram showing high frequency input data that contain the error data in the conventional error picture image correction apparatus.

Hereinafter, the operation of the error picture image data correction apparatus of the present Embodiment configured above is described below. FIG. 3 is a drawing for explaining the input signals of the error picture image data correction apparatus of the present Embodiment when 3 pixel error picture image data are included in high frequency input signal data in G channel. In this example, t represents a certain time width, and 3 pixel error picture image data are assumed to be G(i−2t), G(1−t) and G(i).

Each signal R(i+t), G(i+t), and B(i+t) is inputted to the input terminal 100a, 100b, and 100c of FIG. 1 at time (i+t) respectively. The control circuit 113 generates the control signals Sk, Sa, and Sb, which control the weighted mean value operation part 101, 102, and 103 based on the signal c from the error picture image data detection means. The weighted mean value operation part 101, 102, and 103 calculates weighted mean value output signals RAV(i−2t), GAV(i−2t), and BAV(i−2t) by the Equation 5 at time (i+t), the weighted mean value output signals RAV(i−t), GAV(i−t), and BAV(i−t) by the Equation 6 at time (i+2t), the weighted mean value output signals RAV(i), GAV(i), and BAV(i) by the Equation 7 at time (i+3t) respectively and these weighted mean value output signals are inputted to the channel switch circuit 104 respectively.

$$RAV(i-2t)=\{R(i+t)+3\times R(i-3t)\}/4$$

$$GAV(i-2t)=\{G(i+t)+3\times G(i-3t)\}/4$$

$$BAV(i-2t)=\{B(i+t)+3\times B(i-3t)\}/4 \quad \text{(Equation 5)}$$

$$RAV(i-t)=\{R(i+t)+R(i-3t)\}/2$$

$$GAV(i-t)=\{G(i+t)+G(i-3t)\}/2$$

$$BAV(i-t)=\{B(i+t)+B(i-3t)\}/2 \quad \text{(Equation 6)}$$

$$RAV(i)=\{3\times R(i+t)+R(i-3t)\}/4$$

$$GAV(i)=\{3\times G(i+t)+G(i-3t)\}/4$$

$$BAV(i)=\{3\times B(i+t)+B(i-3t)\}/4 \quad \text{(Equation 7)}$$

The control circuit 113 generates the signal chk and assigns it to the G channel signal that contains error picture image data in order to output the G channel signals as error picture image data by switching the output of the channel switch circuit 104 as the output signal Sk, and generates the signal chj and chl and assigns them to the R and B channel signals respectively which does not contain error picture image data, in order to output the R and B channel signals as true data by switching the output of the channel switch circuit 104 as the output signal Sj and Sl at time (i+t), (i+2t), and (i+3t) based on the channel c outputted from the error picture image data detection means. In this case, the B channel signal may be outputted as the output signal Sj, and the R channel signal may be outputted as the output signal Sl. Adders 105 and 106 generate the differential signals Dj and Dl respectively. As it is understood from FIG. 3, Equation 8 will be determined.

$$Dj=GAV-RAV<Dl=GAV-BAV \quad \text{(Equation 8)}$$

Therefore, the selector 107 outputs Dj(i−2t), Dj(i−t), and Dj(i) one by one according to the control signal cd provided by the control circuit 113. Also, the selector 108 outputs Rj(i−2t), Rj(i−t), and Rj(i) one by one according to the control signal ch2 provided by the control circuit 113. The adder 109 generates the signal G'(i−2t) shown by Equation 9, the signal G'(i−t) shown by Equation 10, and the signal G'(i) shown by Equation 11 one by one.

$$G'(i-2t)=R(i-2t)+\{G(i+t)+3\times G(i-t)-R(i+t)-\times 3R(i-3t)\}/4 \quad \text{(Equation 9)}$$

$$G'(i-t)=R(i-t)+\{G(i+t)+G(i-3t)-R(i+t)-R(i-3t)\}/2 \quad \text{(Equation 10)}$$

$$G'(i)=R(i)+\{3\times G(i+t)+G(i-3t)-3\times R(i+t)-R(i-3t)\}/4 \quad \text{(Equation 11)}$$

As for the output of the adder 109, it is clipped within the picture signal level by the clip circuit 110. The output signal Dc of the clip circuit 110 is inputted to the output switch circuit 111 as a correction data for the error picture image data. The output switch circuit 111 selects the output of the delay element 203 of the weighted mean value operation part 101 and outputs from the output terminal 112a as the R channel output signal which does not contain error picture image data according to the channel signal chk. Also, the output of the delay element 203 of the weighted mean value operation part 101 is outputted from the output terminal 112c as the B channel output signal which does not contain error picture image data. The output switch circuit 111 outputs the G channel signal by replacing the error picture image data G(i−2t) with the error correction data G'(i−2t) shown by Equation 9, replacing the error picture image data G(i−t) with the error correction data G'(i−t) shown by Equation 10, and replacing the error data G(i) with the error correction data G'(i) shown by Equation 11 according to the channel signal chk, and outputs the corrected G channel data from the output terminal 112*b*. This correction data very matches with the true value G(i–2t), G(i–t), and G(i) shown in FIG. 3, the error picture image data correction can be performed accurately for the high frequency data.

When error picture image data are 2 pixels as G(i) and G(i–t), the error picture image data correction also can be performed accurately for the high frequency data by replacing the error picture image data G(i–t) with the correction data calculated by Equation 12, and replacing the error picture image data G(i) with the correction data calculated by Equation 13.

$$R(i-t)+\{G(i+t)+2\times G(i-2t)-R(i+t)-2\times R(i-2t)\}/3 \quad \text{(Equation 12)}$$

$$R(i)+\{2\times G(i+t)+G(i-2t)-2\times R(i+t)-R(i-2t)\}/3 \quad \text{(Equation 13)}$$

Following approximate Equation 14 instead of the above Equation 12 can be used for calculating the correction data for G(i–t), and approximate Equation 15 instead of the above Equation 13 can be used for calculating the correction data for G(i).

$$R(i-t)+\{5\times G(i+t)+11\times G(i-2t)-5\times R(i+t)-11\times R(i-2t)\}/16 \quad \text{(Equation 14)}$$

$$R(i)+\{11\times G(i+t)+5\times G(i-2t)-11\times R(i+t)-5\times R(i-2t)\}/16 \text{(Equation 15)}$$

As described above, according to the error picture image data correction apparatus of this invention, the error data correction can be achieved and the improvement of the picture quality can perform by canceling the deterioration of the picture quality caused by the error picture image data when the error picture image data are continuous plural pixels and the picture image data around the error picture image data are high frequency picture image data. By applying this error picture image data correction apparatus of the present invention to the audio visual products such as a video camera for high-definition television having a number of pixels, a solid state image capturing device containing defective pixels, which has not able to be employed in conventional technology, can be employed in products, and the manufacturing cost of the camera can be reduced.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. An error picture image data correction apparatus comprising an input part for inputting plural picture image data, a selector for selecting a first picture image data and a second picture image data respectively, n error correction part for replacing error picture image data with error correction data on the condition that the first picture image signal at time i is described as x(i), the second picture image signal at time i is described as y(i), t represents time width, n>1, n>k≧0, n and k are integers, and the error picture image data are x(i), x(i–t), x(i–2t), . . . , x(i–(n–1)t), the error picture image data x(i–kt) is replaced with the error correction data substantially expressed by the following equation:

$$y(i-kt)+\{(n-k)x(i+t)+(k+1)x(i-nt)-(n-k)y(i+t)-(k+1)y(i-nt)\}/(n+1)$$

2. The error picture image data correction apparatus according to claim 1, further comprising a clip circuit for controlling the level of the input picture image data within a predetermined range of the picture image signal level.

3. An error picture image data correction apparatus comprising:

an input part for inputting plural picture image data, a selector for selecting a first picture image data and a second picture image data respectively, an error correction part for replacing error picture image data with error correction data on the condition that the first picture image signal at time i is described as x(i), the second picture image signal at time i is described as y(i), t represents time width, n>1, n>k≧0, n and k are integers, and the error picture image data are x(i), x(i–t), the error picture image data x(i) and x(i–t) are replaced with the error correction data calculated by substantially expressed by the following equation:

$$y(i-t)+\{5\times x(i+t)+11\times x(i-2t)-5\times y(i+t)-11\times y(i-2t)\}/16$$

$$y(i)+\{11\times x(i+t)+5\times x(i-2t)-11\times y(i+t)-5\times y(i-2t)\}/16.$$

4. The error picture image data correction apparatus according to claim 3, further comprising a clip circuit for controlling the level of the input picture image data within a predetermined range of the picture image signal level.

5. An error picture image data correction apparatus comprising:

an input part for inputting plural picture image data, a selector for selecting a first picture image data that includes error picture image data and a second picture image data that does not include error picture image data, an error correction part for selecting an error picture image data to be corrected, a preceding correct picture image data that is nearest to the error picture image data in time and a following correct picture image data that is nearest to the error picture image data in time, the error correction part calculating a first weighted mean value of the preceding correct picture image data and the following correct picture image data of the first picture image data where the former value is weighed by the time distance between the error picture image data and the preceding correct picture image data and the latter value is weighed by the time distance between the error picture image data and the following correct picture image data, calculating a second weighted mean value of the preceding correct picture image data and the following correct picture image data of the second picture image data where the former value is weighed by the time distance between the error picture image data and the preceding correct picture image data and the latter value is weighed by the time distance between the error picture image data and the following correct picture image data, and replacing the error picture image data with an error correction data by complementing the differential value of the first weighted mean value and the second weighted mean value to the correct picture image data corresponding to the position of the error picture image data of the second picture image data.

6. The error picture image data correction apparatus according to claim 5, wherein when there are plural channels that do not include the error picture image data, the error correction part selects the channel having the smallest differential value of the first weighted mean value and the second weighing means value and replaces the error picture image data with an error correction data by complementing the differential value of the selected channel to the correct picture image data corresponding to the position of the error picture image data of the second picture image data.

7. The error picture image data correction apparatus according to claim 5, further comprising a clip circuit for controlling the level of the input picture image data within a predetermined range of the picture image signal level.

8. A method for correcting error picture image data comprising the steps of:

inputting plural picture image data, selecting a first picture image data and a second picture image data respectively, replacing error picture image data with error correction data on the condition that the first picture image signal at time i is described as $x(i)$, the second picture image signal at time i is described as $y(i)$, t represents time width, $n>1$, $n>k\geq 0$, n and k are integers, and the error picture image data are $x(i)$, $x(i-t)$, $x(i-2t)$, ..., $x(i-(n-1)t)$, the error picture image data $x(i-kt)$ is replaced with the error correction data calculated by substantially expressed by the following equation:

$$y(i-kt)+\{(n-k)x(i+t)+(k+1)x(i-nt)-(n-k)y(i+t)-(k+1)y(i-nt)\}/(n+1).$$

9. The method for correcting the error picture image data according to claim 8, further comprising the step of controlling the level of the error correction data within the predetermined range of the picture image signal level.

10. A method for correcting error picture image data comprising the steps of:

inputting plural picture image data, selecting a first picture image data and a second picture image data respectively, replacing error picture image data with error correction data on the condition that the first picture image signal at time i is described as $x(i)$, the second picture image signal at time i is described as $y(i)$, t represents time width, $n>1$, $n>k\geq 0$, n and k are integers, and the error picture image data are $x(i)$, $x(i-t)$, the error picture image data $x(i)$ and $x(i-t)$ are replaced with the error correction data calculated by substantially expressed by the following equation:

$$y(i-t)+\{5\times x(i+t)+11\times x(i-2t)-5\times y(i+t)-11\times y(i-2t)\}/16$$

$$y(i)+\{11\times x(i+t)+5\times x(i-2t)-11\times y(i+t)-5\times y(i-2t)\}/16.$$

11. The method for correcting the error picture image data according to claim 10, further comprising the step of controlling the level of the error correction data within the predetermined range of the picture image signal level.

12. A method for correcting error picture image data comprising the steps of:

inputting plural picture image data, selecting a first picture image data which includes error picture image data and a second picture image data which does not include error picture image data, selecting an error picture image data to be corrected, a preceding correct picture image data that is nearest to the error picture image data in time and a following correct picture image data that is nearest to the error picture image data in time, calculating a first weighted mean value of the preceding correct picture image data and the following correct picture image data of the first picture image data where the former value is weighed by the time distance between the error picture image data and the preceding correct picture image data and the latter value is weighed by the time distance between the error picture image data and the following correct picture image data, calculating a second weighted mean value of the preceding correct picture image data and the following correct picture image data of the second picture image data where the former value is weighed by the time distance between the error picture image data and the preceding correct picture image data and the latter value is weighed by the time distance between the error picture image data and the following correct picture image data, and replacing the error picture image data with an error correction data by complementing the differential value of the first weighted mean value and the second weighted mean value to the correct picture image data corresponding to the position of the error picture image data of the second picture image data.

13. The method for correcting the error picture image data according to claim 12, wherein when there are plural channels that do not include the error picture image data, the method further comprises selecting the channel having the smallest differential value of the first weighted mean value and the second weighted mean value and replacing the error picture image data with an error correction data by complementing the differential value of the selected channel to the correct picture image data corresponding to the position of the error picture image data of the second picture image data.

14. The method for correcting the error picture image data according to claim 12, further comprising the step of controlling the level of the error correction data within the predetermined range of the picture image signal level.

* * * * *

UNITED STATES PATENT AND TRADEMARK OFFICE
CERTIFICATE OF CORRECTION

PATENT NO. : 6,424,382 B1
DATED : July 23, 2002
INVENTOR(S) : Yoshida et al.

It is certified that error appears in the above-identified patent and that said Letters Patent is hereby corrected as shown below:

<u>Title page,</u>
Item [30], Foreign Application Priority Data: "Oct. 28, 1998" should read -- Oct. 20, 1998 --

Signed and Sealed this

Sixth Day of April, 2004

JON W. DUDAS
*Acting Director of the United States Patent and Trademark Office*